US011294695B2

(12) United States Patent
Tang et al.

(10) Patent No.: US 11,294,695 B2
(45) Date of Patent: Apr. 5, 2022

(54) TERMINATION OF PROGRAMS ASSOCIATED WITH DIFFERENT ADDRESSING MODES

(71) Applicant: International Business Machines Corporation, Armonk, NY (US)

(72) Inventors: Xiao Yan Tang, Beijing (CN); Naijie Li, Beijing (CN); Jing Lu, Beijing (CN); Ming Ran Liu, Beijing (CN); Kershaw S. Mehta, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 68 days.

(21) Appl. No.: 16/885,716

(22) Filed: May 28, 2020

(65) Prior Publication Data
US 2021/0373917 A1   Dec. 2, 2021

(51) Int. Cl.
*G06F 13/10*  (2006.01)
*G06F 9/445*  (2018.01)
*G06F 9/54*   (2006.01)

(52) U.S. Cl.
CPC .......... *G06F 9/44594* (2013.01); *G06F 9/541* (2013.01)

(58) Field of Classification Search
CPC ............................ G06F 9/44594; G06F 9/541
See application file for complete search history.

(56) References Cited

U.S. PATENT DOCUMENTS

| 4,970,639 | A | 11/1990 | Diefendorf et al. |
| 5,452,456 | A | 9/1995 | Mourey et al. |
| 5,490,256 | A | 2/1996 | Mooney et al. |
| 5,581,769 | A | 12/1996 | Wallace et al. |

(Continued)

FOREIGN PATENT DOCUMENTS

JP   2008305279 A   12/2008

OTHER PUBLICATIONS

Li et al., "Interoperability Between Programs Associated With Different Addressing Modes", U.S. Appl. No. 16/217,971, filed Dec. 12, 2018.

(Continued)

*Primary Examiner* — Doon Y Chow
*Assistant Examiner* — Abdou K Seye
(74) *Attorney, Agent, or Firm* — Cantor Colburn LLP; Teddi Maranzano

(57) ABSTRACT

A computer-implemented method for termination of programs associated with different addressing modes includes receiving a call to an external interface to execute a target callee program from a caller program executing in a primary runtime environment. The external interface allocates an interoperability term area (ITA) in a primary runtime environment. The ITA is accessible by the primary runtime environment and a secondary runtime environment. The external interface executes the target callee program in the secondary runtime environment. The target callee program sets a termination reason parameter in the ITA. In response to the target callee program setting the termination reason parameter, a termination action in the primary runtime environment is performed. Various other methods, systems, and computer-readable media are also disclosed.

20 Claims, 6 Drawing Sheets

(56) References Cited

U.S. PATENT DOCUMENTS

| | | | |
|---|---|---|---|
| 5,724,585 A | 3/1998 | Hassitt et al. | |
| 5,764,947 A | 6/1998 | Murphy et al. | |
| 5,784,638 A | 7/1998 | Goetz et al. | |
| 5,987,495 A * | 11/1999 | Ault | G06F 9/463 710/260 |
| 6,021,265 A | 2/2000 | Nevill | |
| 6,199,202 B1 | 3/2001 | Coutant et al. | |
| 6,502,237 B1 | 12/2002 | Yates et al. | |
| 6,725,366 B1 | 4/2004 | Swanberg | |
| 7,171,543 B1 | 1/2007 | Ronen et al. | |
| 7,406,681 B1 | 7/2008 | Hinker | |
| 7,451,298 B2 | 11/2008 | Peak et al. | |
| 8,813,104 B2 | 8/2014 | Saborowski | |
| 9,569,234 B2 | 2/2017 | De et al. | |
| 9,652,210 B2 | 5/2017 | Suchy et al. | |
| 2004/0268319 A1 | 12/2004 | Tousignant | |
| 2005/0086650 A1 | 4/2005 | Yates et al. | |
| 2006/0184919 A1 | 8/2006 | Chen et al. | |
| 2006/0184920 A1 | 8/2006 | Wang et al. | |
| 2008/0034194 A1 | 2/2008 | Peak et al. | |
| 2009/0089764 A1 | 4/2009 | Lai et al. | |
| 2011/0219213 A1 | 9/2011 | Busaba et al. | |
| 2012/0233612 A1 | 9/2012 | Beckett | |
| 2012/0304160 A1 | 11/2012 | Soeder | |
| 2014/0365754 A1 | 12/2014 | Combs et al. | |
| 2015/0277867 A1 * | 10/2015 | Hasabnis | G06F 9/44521 717/164 |
| 2016/0011869 A1 | 1/2016 | Jackson | |
| 2017/0039367 A1 | 2/2017 | Ionescu et al. | |
| 2017/0329621 A1 | 11/2017 | Beckett | |
| 2018/0165338 A1 * | 6/2018 | Kumar | G06F 9/45533 |
| 2018/0276016 A1 * | 9/2018 | Duminy | G06F 9/546 |

OTHER PUBLICATIONS

Lu et al., "Parameter Management Between Programs", U.S. Appl. No. 16/380,232, filed Apr. 10, 2019.

List of IBM Patents or Patent Applications Treated as Related; (Appendix P), Filed May 29, 2020; 2 pages.

Microsoft; "32-bit and 64-bit Interoperability;" https://msdn.microsoft.com/en-us/library/windows/desktop/ee872017(v=vs.85).aspx; retrieved Jun. 23, 2018; pp. 1-2.

IBM "select/selectex (BPX1SEL, BPX4SEL)—Select on file descriptors and message queues" https://www.IBM.com/support/knowledgecenter/en/SSLTBW_2.3.0/com.IBM.zos.v2r3.bpxb100/sel.htm (Retrieved Aug. 20, 2020), 12 pages.

List of IBM Patents or Patent Applications Treated as Related; (Appendix P), Filed Jun. 25, 2021; 2 pages.

Microsoft, "Process Interoperability;" https://docs.microsoft.com/en-us/windows/win32/winprog64/process-interoperability (retrieved Oct. 21, 2019), 1 page.

* cited by examiner

TERMINATION OF PROGRAMS ASSOCIATED WITH DIFFERENT ADDRESSING MODES

BACKGROUND

The present invention relates generally to programs associated with different addressing modes, and more particularly, to termination of interoperating programs associated with different addressing modes.

Computers with 32-bit processor architecture designs are increasingly being replaced by computers with 64-bit processor architectures. An n-bit processor (e.g., a central processing unit (CPU)) includes various registers, each of which is capable of referencing $2^n$ memory addresses that are, in turn, used to access corresponding data stored in random access memory (RAM). For instance, each register in a 32-bit processor is capable of referencing $2^{32}$ memory addresses, which corresponds to 4 gigabytes of RAM because each bit in the register can reference an individual byte in memory. In contrast, each register in a 64-bit processor is capable of theoretically referencing $2^{64}$ memory addresses corresponding to 16 exabytes of RAM—several orders of magnitude greater than a 32-bit register.

Generally speaking, a particular operating system (O/S) is configured to run on a particular n-bit processor. For instance, a 32-bit O/S is configured to run on a 32-bit processor while a 64-bit O/S is configured to run on a 64-bit processor. A lower bit O/S can run on a higher bit processor, but not the other way around. For example, a 32-bit O/S can run on a 64-bit processor, but a 64-bit O/S cannot run on a 32-bit processor. Similarly, computer programs, applications, or the like are typically written for a particular n-bit O/S (e.g., a 64-bit program for a 64-bit O/S). Further, while a lower bit program can be handled by a higher bit O/S (e.g., a 32-bit program running on a 64-bit O/S), the converse is generally not true. That is, a lower bit O/S generally cannot handle execution of a higher bit program. For instance, a 64-bit application cannot run on a 32-bit processor (or be handled by a 32-bit O/S) because the 64-bit instructions of the 64-bit application will not be recognized by a 32-bit processor.

SUMMARY

In one or more example embodiments, a method for termination of programs associated with different addressing modes is disclosed. The method includes receiving, from a caller program executing in a primary runtime environment, a call to an external interface to execute a target callee program. The caller program is associated with a first addressing mode and the target callee program is associated with a second addressing mode that is different from the first addressing mode. The external interface allocates an interoperability term area (ITA) in a primary runtime environment, wherein the ITA is accessible by the primary runtime environment and a secondary runtime environment. The external interface executes the target callee program in the secondary runtime environment. The target callee program sets a termination reason parameter in the ITA. In response to the target callee program setting the termination reason parameter, a termination action is performed in the primary runtime environment.

The technical solutions can also be implemented by a system, a computer program product, an apparatus, a machine, a device, or in other practical applications in one or more embodiments of the present invention.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
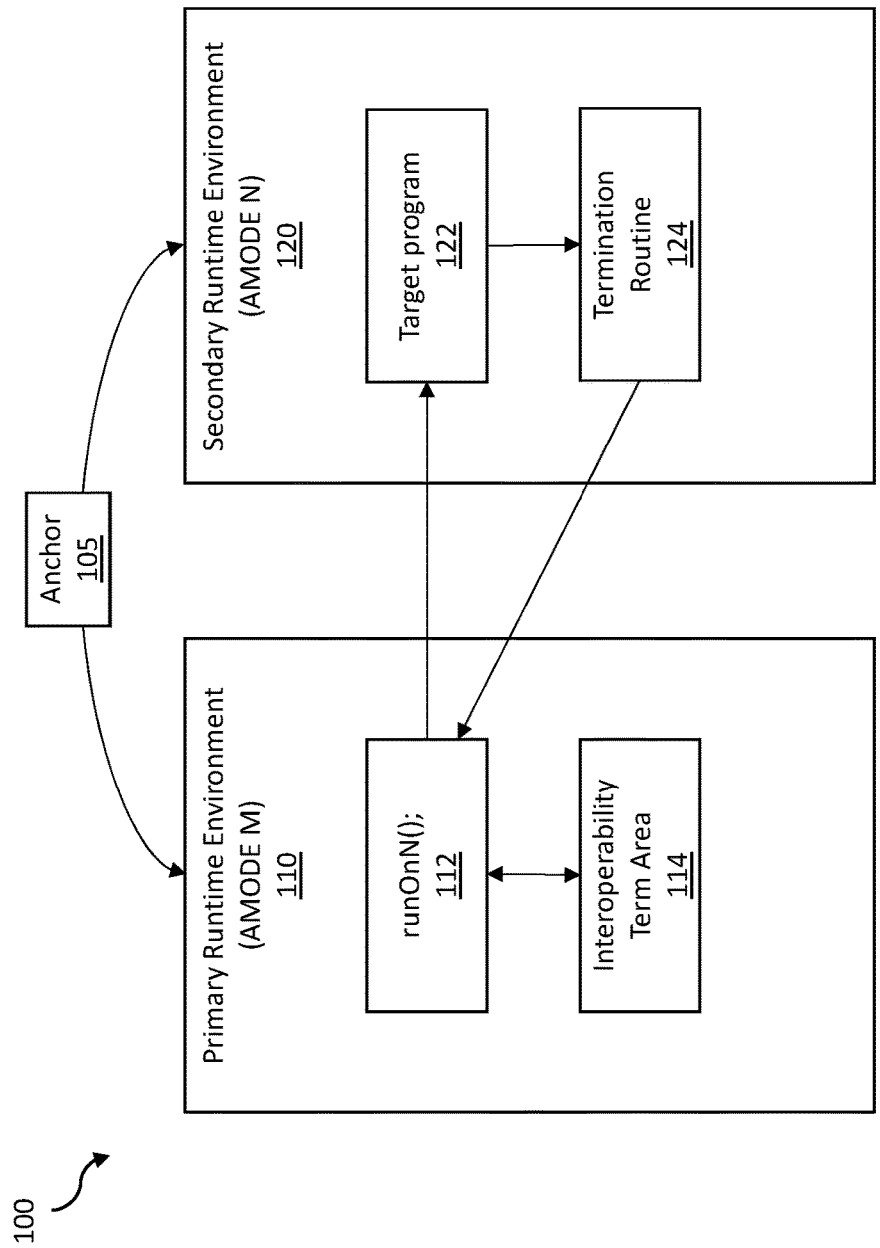
FIG. 1 is a schematic diagram illustrating a normal termination of a target callee program in a secondary runtime environment in response to a call to an external interface from a caller program in a single-threaded primary runtime environment in accordance with one or more example embodiments.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

Example embodiments of the present invention relate to, among other things, systems, methods, computer-readable media, techniques, and methodologies for termination of programs associated with different addressing modes. Conventional approaches exist for supporting interactions between programs associated with different addressing modes such as 32-bit and 64-bit programs. These approaches, however, suffer from a number of technical drawbacks. Technical solutions for termination of interoperable programs associated with different addressing modes that address technical drawbacks associated with conventional approaches are described herein.

The different addressing modes are referred to herein generically as AMODE M and AMODE N, where M and N are different values. For instance, in example embodiments, a program associated with addressing mode AMODE M can be a 31-bit or 32-bit program and a program associated with addressing mode AMODE N can be a 64-bit program, or vice versa. While example embodiments can be described with respect to interoperability between 32-bit and 64-bit programs, it should be appreciated that the programs can be any N-bit and M-bit programs as long as N and M represent different values (i.e., different addressing modes). In addition, the term program as used herein encompasses any software application, program module, or more generally, computer-executable code configured to execute on a computer processor. Further, interoperability between programs associated with different addressing modes can include the capability to handle cross-AMODE function calls (i.e., calls between a caller and a callee associated with different addressing modes) including, without limitation, dynamic linkage function calls (e.g., where the caller and the callee are in different executables); static linkage function calls (e.g., where the caller and the callee are in the same executable); dynamic calls; and so forth.

Many 64-bit programs have recently become more prevalent due to their ability to provide better scalability and much larger memory addressability than 32-bit programs. Further, more 64-bit programs are being written to leverage certain innovations only available with the 64-bit addressing mode. There remain, however, many 32-bit programs that continue to play a vital role in critical workloads. Thus, interaction between 32-bit programs and 64-bit programs is necessary to modernize the business logic of workloads, while at the same time, maintaining the viability of legacy 32-bit programs. For example, some legacy code exists in executable form only, the source having been lost over time. Also, attempting to execute 32-bit legacy code in a 64-bit environment will cause an abnormal termination that may cause an outage in the enterprise application environment.

There are various differences between different addressing modes that make interoperability between programs written in the different addressing modes difficult including, without limitation, different memory addressability capabilities (e.g., 4 gigabyte for a 32-bit addressing mode and 16 exabytes for a 64-bit addressing mode) and different linkage conventions that define how stack frames are managed and how parameters are passed. With respect to linkage convention differences, in a 64-bit program, for example, save areas and registers are twice as large as in a 32-bit program such that calling conventions for a 64-bit program take advantage of the additional register space to pass more arguments in registers. Further, 32-bit programs utilize a standard linkage convention (upward stack) while 64-bit programs utilize a different linkage convention (downward stack).

There are various existing approaches for supporting 32-bit and 64-bit interactions, each of which suffers from various technical drawbacks. For example, inter-process communication has been used but the overhead that it introduces contributes to poor performance. Moreover, redesign of the original application is required including additional development and testing which requires significant effort and can result in significant delay. In addition, each programming language has its own inter-process communication semantics which can result in issues for calls between different languages. Another existing approach for supporting 32-bit and 64-bit interactions is a remote call based on, for example, a RESTful Application Programming Interface (API). However, the performance associated with remote calls is even worse than with inter-process communication. Yet another existing approach is to recompile an application. For example, a 32-bit application can be recompiled as a 64-bit application. This approach, however, is an all-or-none approach that requires recompilation of all programs in an application, which can be a disruptive migration particularly for large enterprises. In addition, some languages still have no 64-bit support (e.g., Enterprise COBOL).

Example embodiments of the present invention provide an interoperability methodology for programs associated with different addressing modes that is based on creating and utilizing a pre-initialized secondary runtime environment to enable function calls across the different addressing modes. This interoperability technique in accordance with example embodiments of the present invention represents a technical solution that addresses the aforementioned technical problems associated with existing approaches for supporting interaction across addressing modes. In particular, an interoperability technique in accordance with example embodiments of the present invention does not require any changes to be made to programs written in their respective addressing modes and is language-independent meaning that interoperability is supported between any languages and any addressing modes. In addition, the pre-initialized secondary runtime environment that is generated and utilized in accordance with example embodiments is persistent, and thus, can support multiple interoperability calls, which in turn, improves performance. Still further, an interoperability technique in accordance with example embodiments can be used in connection with any existing compiler; a Java Native Interface (JNI); or any other system/runtime/software to support the interoperability of programs associated with different addressing modes. In addition, in accordance with example embodiments, the respective executions of different addressing mode programs are separated which allows for easier debugging. Each of these technical improvements associated with an interoperability technique in accordance with example embodiments constitutes technical effects of the present invention that together represent an improvement in computer technology and the functioning of a computer. In particular, these technical improvements improve the functioning of a computer by allowing for improved cross-addressing mode interactions between programs associated with different addressing modes.

Illustrative methods in accordance with example embodiments of the present invention will now be described. It should be noted that each operation of any of the method 500 can be performed by one or more of the program modules or the like depicted in FIG. 6, whose operation will be described in more detail hereinafter. These program modules can be implemented in any combination of hardware, software, and/or firmware. In certain example embodiments, one or more of these program modules can be implemented, at least in part, as software and/or firmware modules that include computer-executable instructions that when executed by a processing circuit cause one or more operations to be performed. A system or device described herein as being configured to implement example embodiments can include one or more processing circuits, each of which can include one or more processing units or nodes. Computer-executable instructions can include computer-executable program code that when executed by a processing unit can cause input data contained in or referenced by the computer-executable program code to be accessed and processed to yield output data.

FIG. 1 is a schematic diagram illustrating a system 100 handling a normal termination of a target callee program in a secondary runtime environment in response to a call to an external interface from a caller program in a single-threaded primary runtime environment in accordance with one or more example embodiments. In some examples, the term AMODE refers to an addressing mode, which can be the way in which an operand of an instruction is specified. For example, an AMODE can specify a rule for interpreting or modifying the address field of the instruction before the operand is executed. A primary runtime environment is a runtime environment that supports the execution of an AMODE M program, while a secondary runtime environment can be a runtime environment that is created by a primary runtime environment to support execution of a program of a different addressing mode, such as AMODE N. Paired runtime environments can refer to a primary runtime environment and a paired secondary runtime environment, in which the secondary runtime environment has been created by the primary runtime environment.

A caller program executing within a current primary single-threaded runtime environment 110 (e.g., AMODE M environment) makes a call to an external interface (runOnN( ) 112) to execute a target callee program 122 in a secondary runtime environment 120 (e.g., AMODE N environment). In example embodiments, the caller program and the target callee program are associated with different addressing modes. For instance, the caller program can be 32-bit and the target callee program can be 64-bit, or vice versa. To facilitate interoperability between the 32-bit caller program of the primary runtime environment 110, an external interface 112 can facilitate execution of a secondary runtime environment 120 to execute the 64-bit target callee program 122 to enable communication between the 32-bit caller program of the primary runtime environment 110 and the 64-bit target callee program 122. Thus, in example embodiments, the external interface 112 can represent a call to an AMODE N program from an AMODE M program. The caller program can be any computer-executable code including, without limitation, an application, a compiler, a runtime library; or the like. The caller program can call the external interface 112 (e.g., runOnN( )) by providing the target program name and any associated parameters.

The external interface allocates a block of storage in the primary runtime environment as an interoperability term area (ITA) 114. The ITA 114 is used for sharing information between the primary runtime environment 110 (e.g., AMODE M environment) and the secondary runtime environment 120 (e.g., AMODE N environment) and is anchored at thread level. The ITA 114 can store data that includes, but is not limited to, context data for a runtime environment, a termination reason parameter, and/or a return point address. The context data can include the context data of a last call made by a program in a runtime environment. The termination reason parameter is a variable indicating the type of termination, such as NORMAL or ABNORMAL. The return point address is a point or address to return to after a specified event, such as a termination of a program.

The external interface 112 (runOnN( )) saves the current context of the primary single-threaded runtime environment 110 (e.g., AMODE M environment) to the ITA 114 and sets the return point address in the ITA 114 to point to a termination part in the external interface. The external interface can create the secondary runtime environment 120 (e.g., AMODE N environment) which is anchored 105 to the primary runtime environment 110. In some example embodiments, the anchor 105 associates or assigns the secondary runtime environment 110 to the ITA 114 of the primary runtime environment 110. The anchor 105 can be an address of the ITA 114 that can be accessed by the primary runtime environment 110 and the secondary runtime environment 120. In example embodiments, the primary runtime environment 110 and the secondary runtime environment 120 reside on the same task or thread. The external interface 112 executes the target callee program 122 in the secondary runtime environment 120.

In response to the target callee program 122 executing in the secondary runtime environment 120 terminating, an AMODE N termination routine 124 is triggered. The termination routine 124 accesses the ITA 114 (via the external interface 112) of the primary runtime environment 110 and sets the termination reason parameter. For example, the termination routine 124 can set the termination reason parameter of the ITA 114 as NORMAL. The termination routine 124 clears the anchor 105 information and shared data area of the paired runtime environments (e.g., primary runtime environment 110 and secondary runtime environment 120) and releases all resources of the secondary runtime environment 120. The termination routine 124 can switch control back to the primary runtime environment 110 and restore the context according to the information saved in the ITA 114. Additionally, using the return point address, the termination routine 124 can return to the point identified by the return point address retrieved from the ITA 114. The caller program executing in the primary runtime environment 110 can continue without disruption.

Figure 2:
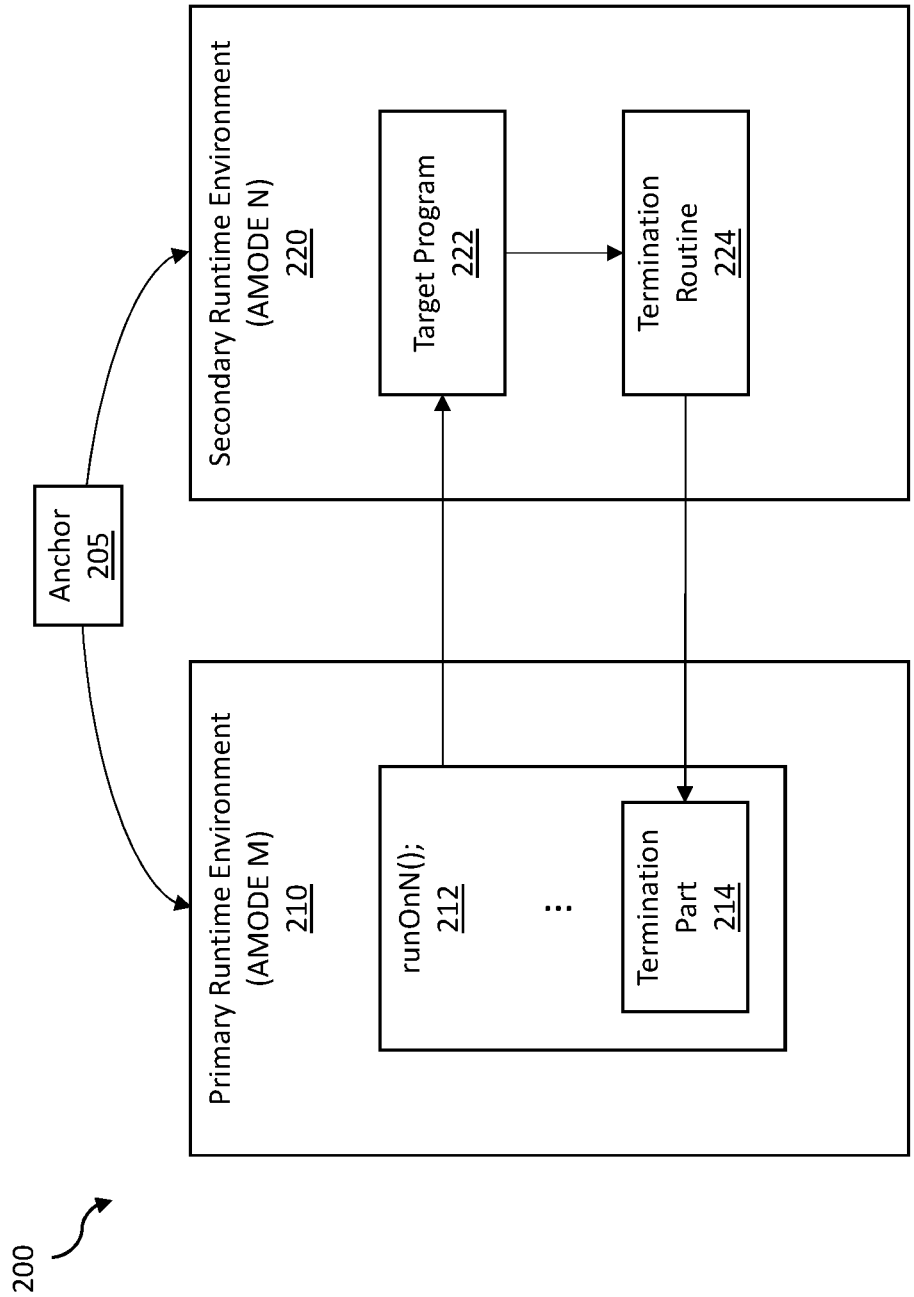
FIG. 2 is a schematic diagram illustrating an abnormal termination of a target callee program in a secondary runtime environment in response to a call to an external interface from a caller program in a single-threaded primary runtime environment in accordance with one or more example embodiments.

FIG. 2 is a schematic diagram illustrating a system 200 handling an abnormal termination of a target callee program in a secondary runtime environment in response to a call to an external interface from a caller program in a single-threaded primary runtime environment in accordance with one or more example embodiments.

A caller program executing within a primary single-threaded runtime environment 210 makes a call to an external interface (runOnN( ) 212) to execute a target callee program 222 in a secondary runtime environment 220. In example embodiments, the caller program and the target callee program are associated with different addressing modes. The external interface 112 represents a call to an AMODE N program from an AMODE M program. The caller program can be any computer-executable code including, without limitation, an application, a compiler, a runtime library, or the like. The caller program calls the external interface 112 (e.g., runOnN( )) by providing the target program name and any associated parameters.

The external interface 112 allocates a block of storage in the primary runtime environment as an interoperability term area (ITA) 114 (shown in FIG. 1). For example, the external interface allocates the ITA 114 using getITA( ), which can create a new ITA which can be accessed by both AMODE M and AMODE N environments and returns an anchor 205 address (e.g., address of the ITA 114). The anchor 205 address can enable the AMODE M and AMODE N environments to access the ITA 114.

The external interface 212 saves the current context of the current primary single-threaded runtime environment 210 to the ITA 114 and sets the return point address in the ITA 114 to point to a termination part 214 in the external interface 212. The external interface 212 creates the secondary runtime environment 220 (e.g., AMODE N environment) and established an anchor 205 to the primary runtime environment 210. The external interface 212 executes the target callee program 222 in the secondary runtime environment 120.

In response to the target callee program 122 executing in the secondary runtime environment 120 terminating, an AMODE N termination routine 224 is triggered. The termination routine 224 accesses the ITA 114 of the primary runtime environment 210 and sets the termination reason parameter, for example, as ABNORMAL. The termination routine 224 terminates the secondary runtime environment 220 and returns control of to the primary runtime environment 210. The termination routine 224 returns to the point identified by the return point address retrieved from the ITA 114, such a termination part 214. In response to determining that the termination reason parameter is set to ABNORMAL, the termination part 214 terminates the primary runtime environment 210.

Figure 3:
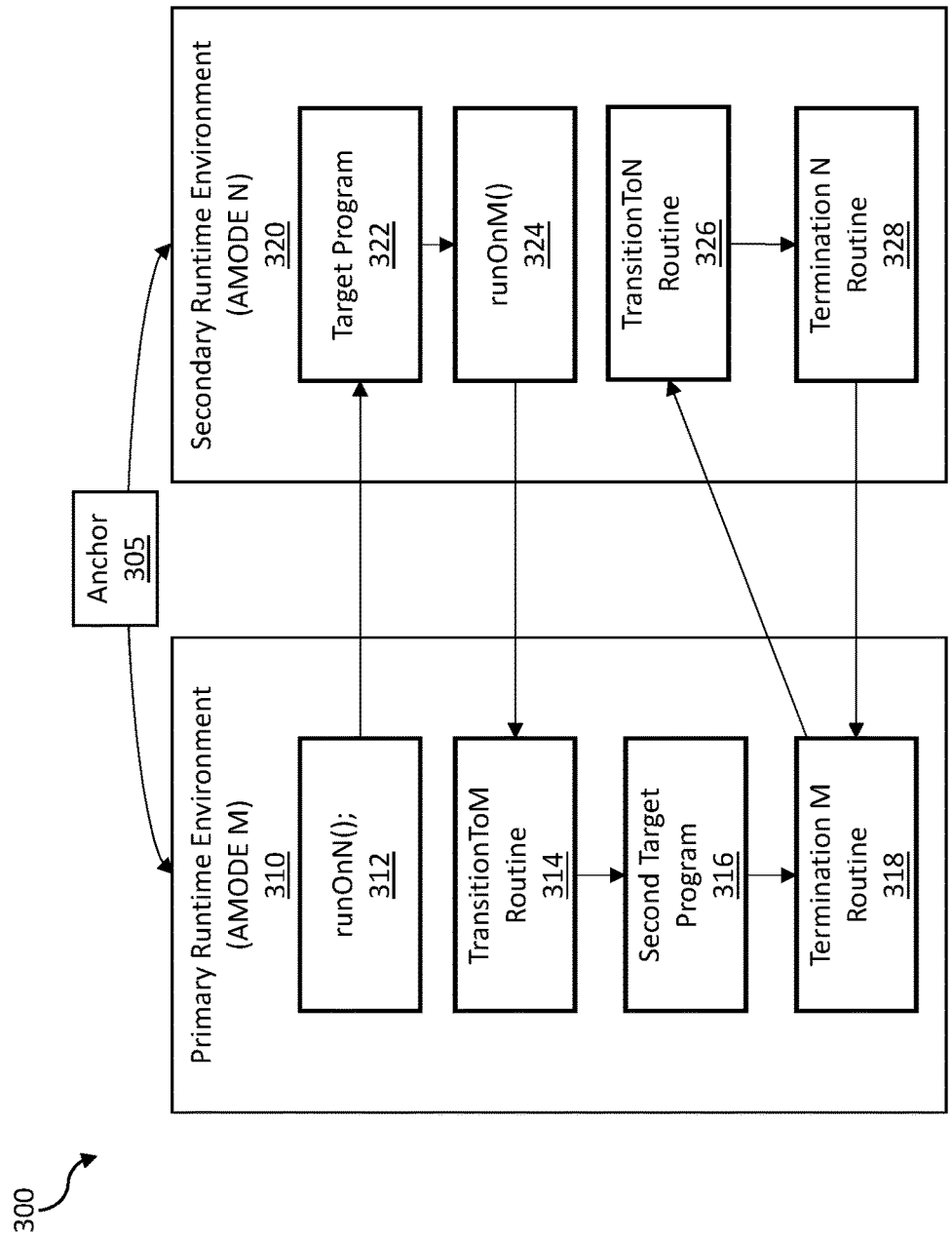
FIG. 3 is a schematic diagram illustrating termination, in a secondary runtime environment, of a target callee program having a nested crossing of addressing mode calls in response to a call to an external interface from a caller program in a single-threaded primary runtime environment in accordance with one or more example embodiments.

FIG. 3 is a schematic diagram illustrating a system 300 involving nested calls between a primary and a secondary runtime environment in accordance with one or more example embodiments. In some example embodiments, a caller program executing within a current primary single-threaded runtime environment 310 (e.g., AMODE M environment) makes a call to an external interface 312 (e.g., runOnN( )) to execute the target callee program 322. In example embodiments, the caller program is associated with a first addressing mode that is different from a second addressing mode associated with the first target callee program 322.

The external interface 312 saves the current context of the current primary single-threaded runtime environment 310 (e.g., the AMODE M environment) to an ITA 114 (shown in FIG. 1) of the primary runtime environment 310. The external interface 312 sets the return point address in the ITA to point to the termination part in of the external interface. Execution of the target callee program 322 is initiated within a pre-initialized secondary runtime environment 320 (e.g., AMODE N pre-initialized environment). In some example embodiments, the external interface 312 can perform operations for determining whether the call to the external interface 312 is a first call to the interface, and if so, operations for creating the secondary runtime environment 320 and anchoring 305 it to the primary runtime environment 310 (e.g., AMODE M environment).

In example embodiments, primary runtime environment information can be anchored in the AMODE N pre-initialized secondary runtime environment 320. Such primary runtime environment information includes, for example, a nested call to a second target callee program 316 that is associated with the first addressing mode. If such a call to external interface runOnM( ) is identified during execution of the first target callee program 322, then the secondary runtime environment 320 switches back to the primary runtime environment 310 through a call to the TransitionToM routine 314 to return control the primary runtime environment 310.

The TransitionToM routine 314 saves the context of the external interface runOnM( ) 324 to the ITA of the primary runtime environment 310. Then, the TransitionToM routine 314 calls the second target callee program 316 using a linkage convention for the first addressing mode associated with the second target callee program 316. In example embodiments, the TransitionToM routine 314 is configured to handle parameter passing, stack manipulation, etc. for the first addressing mode.

In example embodiments, when control is returned from the second target callee program 316, the second target callee program 316 executes until it terminates. In response to a detected termination of the second target callee program 316, a termination M routine 318 of the external interface sets the termination reason parameter of the ITA 114 and performs a termination action. The termination action includes, but is not limited to calling on the termination N routine 328 of the secondary runtime environment 320. The primary runtime environment 310 switches back to the secondary runtime environment 330 through a call to the TransitionToN routine 326 to return control the secondary runtime environment 320.

The TransitionToN routine 326 saves the context of the external interface runOnN( ) 312 to the ITA of the primary runtime environment 310 and sets the return point address in the ITA 114 to the termination M routine 318. Then, the TransitionToN routine 326 calls the termination N routine 328. The termination N routine 328 terminates the secondary runtime environment 320 and returns to the termination M routine 318. In some example embodiments, the termination M routine 318 determines that the termination reason parameter is set to NORMAL and the primary runtime environment 310 continues to execute without disruption. In some example embodiments, the termination M routine 318 determines that the termination reason parameter is set to ABNORMAL and the primary runtime environment 310 is terminated with an ERROR CODE indication why the primary runtime environment 310 was terminated.

Figure 4:
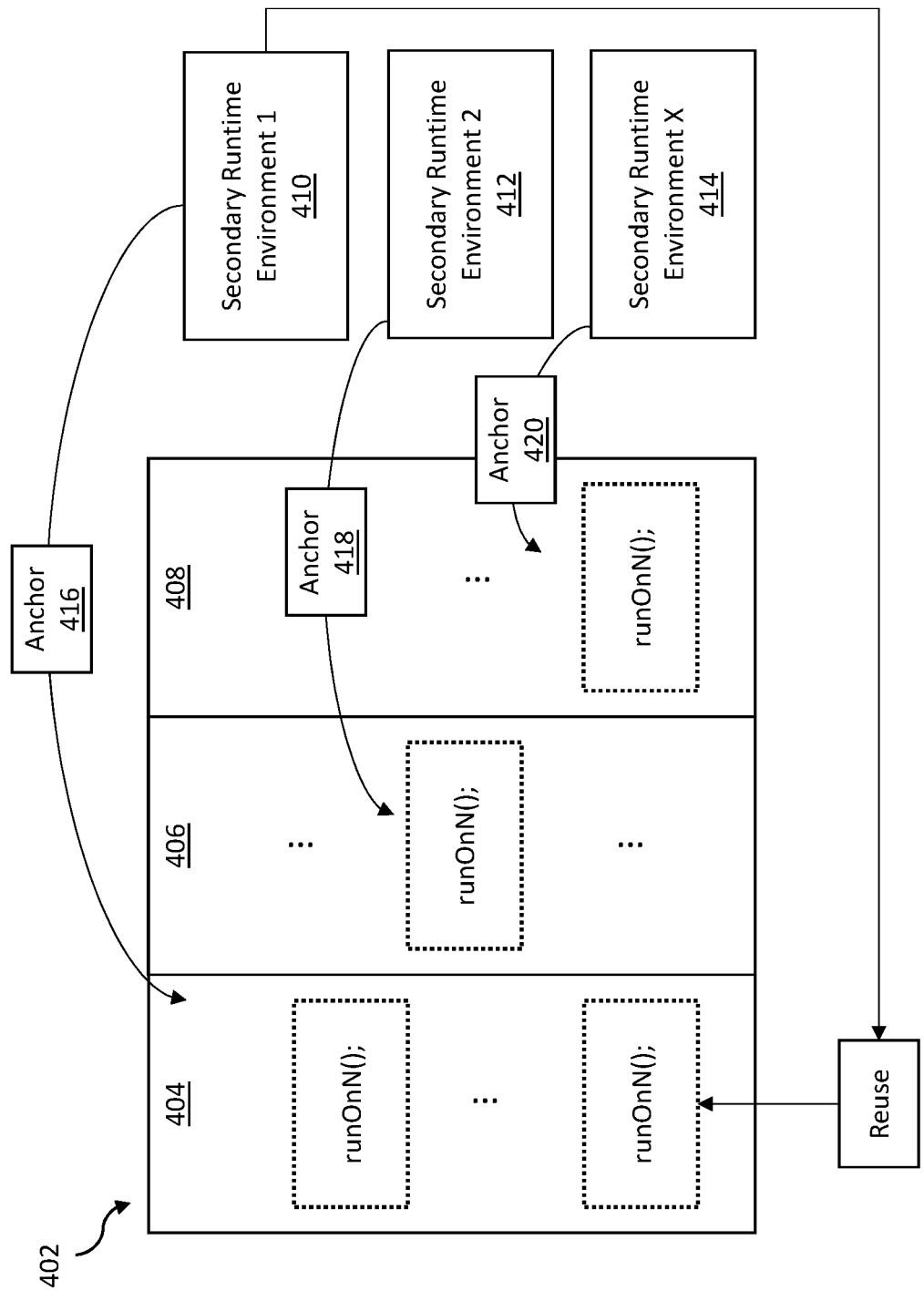
FIG. 4 is a schematic diagram illustrating execution of target callee programs in secondary runtime environments respectively corresponding to threads of a multi-threaded primary runtime environment in accordance with one or more example embodiments.

FIG. 4 is a schematic diagram illustrating interoperability between AMODE N and AMODE M programs in a multi-threaded runtime environment in accordance with one or more example embodiments.

In some example embodiments, a first caller program executing within a first thread 404 of a multi-threaded primary runtime environment (AMODE M environment) makes a call to an external interface runOnN( ) to execute a first target callee program. In example embodiments, the first caller program is associated with a first addressing mode (M) that is different from a second addressing mode (N) associated with the first target callee program. The first target callee program is executed within a first pre-initialized secondary runtime environment 410 (AMODE N pre-initialized environment) that corresponds to the first thread 404. In example embodiments, if this is the first call to the external interface runOnN( ) within thread 404, then the first pre-initialized secondary runtime environment 410 is created and anchored 416 to the first thread 404.

A second caller program executing within a second thread 406 of the primary multi-threaded runtime environment 402 (the AMODE M environment) makes a call to the external interface runOnN( ) to execute a second target callee program. In example embodiments, the second target callee program is associated with the same addressing mode (N) as the first target callee program. The second target callee program is executed within a second pre-initialized secondary runtime environment 412 (AMODE M pre-initialized environment) that corresponds to the second thread 406. In example embodiments, if this is the first call to the external interface runOnN( ) within thread 406, then the second pre-initialized secondary runtime environment 412 is created and anchored 418 to the second thread 406.

In example embodiments, an $x^{th}$ caller program (which can be the same caller program as the first caller program or a different caller program) executing within the first thread 404 of the primary multi-threaded runtime environment 402 (the AMODE M environment) makes a call to the external interface runOnN( ) to execute an $x^{th}$ target callee program. In example embodiments, the $x^{th}$ target callee program is associated with the same addressing mode (N) as the first target callee program and the second target callee program. The $x^{th}$ target callee program is executed within an $x^{th}$ pre-initialized secondary runtime environment 414 (e.g., AMODE N pre-initialized environment) that corresponds to the second thread 406. In example embodiments, if this is the first call to the external interface runOnN( ) within thread 408, then the $x^{th}$ pre-initialized secondary runtime environment is created and anchored 420 to the $x^{th}$ thread 408.

In some example embodiments, a new ITA is created for each pre-initialized runtime environment for each thread, in order to share the termination information for each thread. When an AMODE M program executing on the primary multi-threaded runtime environment 402 drives the termination, the AMODE M termination routine executing in the first terminating thread 404 would send signal to all other threads (e.g., 406 and 408) to trigger the termination routine on each other thread. When AMODE N program executing on one of the secondary runtime environments (e.g., 410, 412, 414) drives the termination, the termination part of runOnN( ) driven by the AMODE N termination routine sends signal to all other threads to trigger the termination routine on each other thread.

In some example embodiments, each ITA anchored in thread level control block for associated pre-initialized secondary runtime environment can be reused, if there are subsequent non-nested calls of runOnM( ) and/or runOnN( ) in that thread. When the primary multi-threaded environment terminates, the numerous ITA will be released.

In the above-described manner, new pre-initialized secondary runtime environments are created as nested runtime environments within the multi-threaded primary runtime environment such that a respective pre-initialized secondary runtime environment operates as a respective nested environment within each thread of the primary runtime environment. Although not depicted, it should be understood that, in example embodiments, that calls to the external interface in other threads of the multi-threaded primary runtime environment result in execution of the target callee program in corresponding pre-initialized secondary runtime environments. It should further be appreciated that when a pre-initialized secondary runtime environment is created in response to a first call to the external interface within a given thread, the secondary runtime environment is anchored to the primary runtime environment. For instance, a first call to the external interface runOnN( ) in the $x^{th}$ thread 408 results, in example embodiments, in creation of the pre-initialized secondary runtime environment 414 and anchoring 420 of the environment to the $x^{th}$ thread 408. It should also be appreciated while threads are illustratively depicted in FIG. 4, the multi-threaded primary runtime environment 402 (e.g., AMODE M environment) can include any number of threads.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 5:
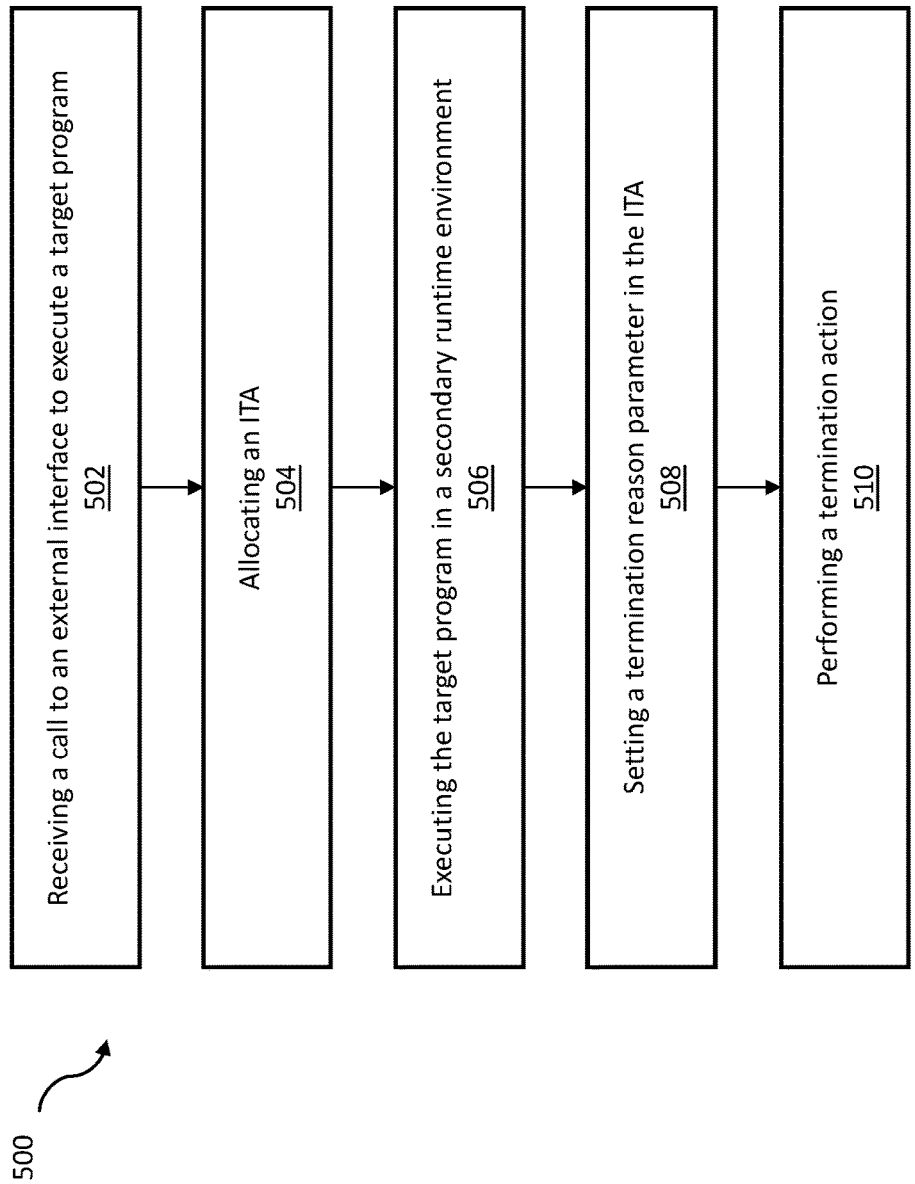
FIG. 5 is a process flow diagram of an illustrative method for terminating a target callee program in a secondary runtime environment in response to a call to an external interface from a caller program in a primary runtime environment in accordance with one or more example embodiments.

An illustrative method in accordance with example embodiments of the disclosure and corresponding data structures (e.g., modules, units, and other such components) for performing the methods are now described. It should be noted that each operation of the method 500 depicted in FIG. 5 is performed by one or more of the modules or the like described herein. These modules can be implemented in any combination of hardware, software, and/or firmware as described herein. In certain example embodiments, one or more of these modules can be implemented, at least in part, as software and/or firmware modules that include computer-executable instructions that when executed by a processing circuit cause one or more operations to be performed. A system or device described herein as being configured to implement example embodiments can include one or more processing circuits, each of which can include one or more processing units or nodes. Computer-executable instructions can include computer-executable program code that when executed by a processing unit can cause input data contained in or referenced by the computer-executable program code to be accessed and processed to yield output data.

FIG. 5 is a flow diagram of an example computer-implemented method 500 for terminating a target callee program in a secondary runtime environment in response to a call to an external interface from a caller program in a primary runtime environment in accordance with one or more example embodiments. The blocks shown in FIG. 5 can be performed by any suitable computer-executable code and/or computing system, such as in a primary runtime environment and/or a secondary runtime environment of a computing system. In one example, each of the blocks shown in FIG. 5 can represent an algorithm whose structure includes and/or is represented by multiple sub-blocks, examples of which will be provided in greater detail below.

As illustrated in FIG. 5, at block 502 one or more of the systems described herein receives a call to an external interface to execute a target program. The systems described herein can perform block 502 in any suitable manner. For example, a caller program executing in a primary runtime environment 110 (e.g., AMODE M) can call an external interface 112 (e.g., runOnN( )) to execute a target program, such as target callee program 122.

The target program can be a different addressing mode than the caller program, thus needing to be executed in a runtime environment that supports a different addressing mode. For example, the addressing mode of the caller program can be a lower bit addressing mode than the addressing mode of the target callee program and/or the addressing mode of the caller program can be a higher bit addressing mode than the addressing mode target callee program. In some example embodiments, the primary runtime environment 110 can be a single threaded environment. The primary runtime environment 110 can be a multi-threaded runtime environment and the secondary runtime environment 120 can correspond to a respective thread of the multi-threaded runtime environment, as described with relation to FIG. 4.

At block 504, one or more of the systems described herein allocates an ITA. The systems described herein can perform block 504 in any suitable manner. For example, external interface can allocate a block of storage in the primary runtime environment 110 as the ITA 114. The ITA 114 is used for sharing information between the primary runtime environment 110 (e.g., AMODE M environment) and the secondary runtime environment 120 (e.g., AMODE N environment) and is anchored at thread level. The ITA 114 can store data that includes, but is not limited to, context data for a runtime environment, a termination reason parameter, and/or a return point address.

In some example embodiments, prior to execution of the target callee program 122 in the secondary runtime environment 120, the external interface 112 can save a context of the primary runtime environment 110 to the ITA 114. Similarly, prior to execution of the target callee program 122, the external interface can save a return point address to a termination part of the external interface 112 of the primary runtime environment 110.

At block 506, one or more of the systems described herein executes the target program in a secondary runtime environment. The systems described herein can perform block 506 in any suitable manner. For example, the external interface 112 can determine that the target callee program 122 is of a different addressing mode than the caller program executing in the primary runtime environment 110. The external interface 112 can switch to AMODE N and create a secondary runtime environment 120 associated with the addressing mode associated with the target callee program 122. In some example embodiments, the external interface 112 can select a pre-initialized runtime environment to create the secondary runtime environment 120. Because the second runtime environment is created in response to a caller program requesting execution of the target callee program 122, the secondary runtime environment 120 and the primary runtime environment 110 are paired runtime environments.

In response to creating the secondary runtime environment 120, the external interface 112 can execute the target callee program 122 in the secondary runtime environment 120.

At block 508, one or more of the systems described herein sets a termination reason parameter in the ITA. The systems described herein can perform block 508 in any suitable manner. For example, in response to the target callee program 122 terminating, a termination routine 124 can be triggered. The termination routine 124 sets the termination reason parameter of the ITA 114. The termination reason parameter of the ITA 114 in the primary runtime environment can be set, for example, as NORMAL or ABNORMAL, depending on the type of termination of the target callee program 122. For example, if the target callee program 122 terminated as a result of completing one or more tasks, in response to a user input to terminate, or any normal or typical reason for termination, the termination routine 124 sets the termination reason parameter of the ITA 114 to NORMAL. If the termination of the target callee program 122 is not typical or normal, the termination routine 124 sets the termination reason parameter of the ITA 114 to ABNORMAL. Examples of an abnormal termination can include accessing an invalid address, insufficient resource availability, and the like.

In some example embodiments, the termination routine 124 can perform additional tasks, such as clearing anchors information and shared data area of paired runtime environments, releasing resources of the secondary runtime environment 120, and/or returning control to the primary runtime environment.

At block 510, one or more of the systems described herein performs a termination action. The systems described herein can perform block 510 in any suitable manner. For example, external interface 112 can determine that the termination reason parameter of the ITA 114 has been set by the termination routine 124 from the secondary runtime environment 120. In response to determining that the termination reason parameter is set to NORMAL, the external interface 112 can perform a termination action that can include tasks, such as terminating the secondary runtime environment 120, returning control to the primary runtime environment 110, and/or restoring the context of the primary runtime environment 110 using the stored context from the ITA 114.

In response to determining that the termination reason parameter is set to ABNORMAL, the external interface 112 can perform a termination action that can include tasks, such as terminating the secondary runtime environment 120 and returning control to the primary runtime environment 110. In response to terminating the secondary runtime environment 120, the external interface 112 can return to the return point address from the ITA 114 and terminate the primary runtime environment 110 with, for example, an ERROR code.

Figure 6:
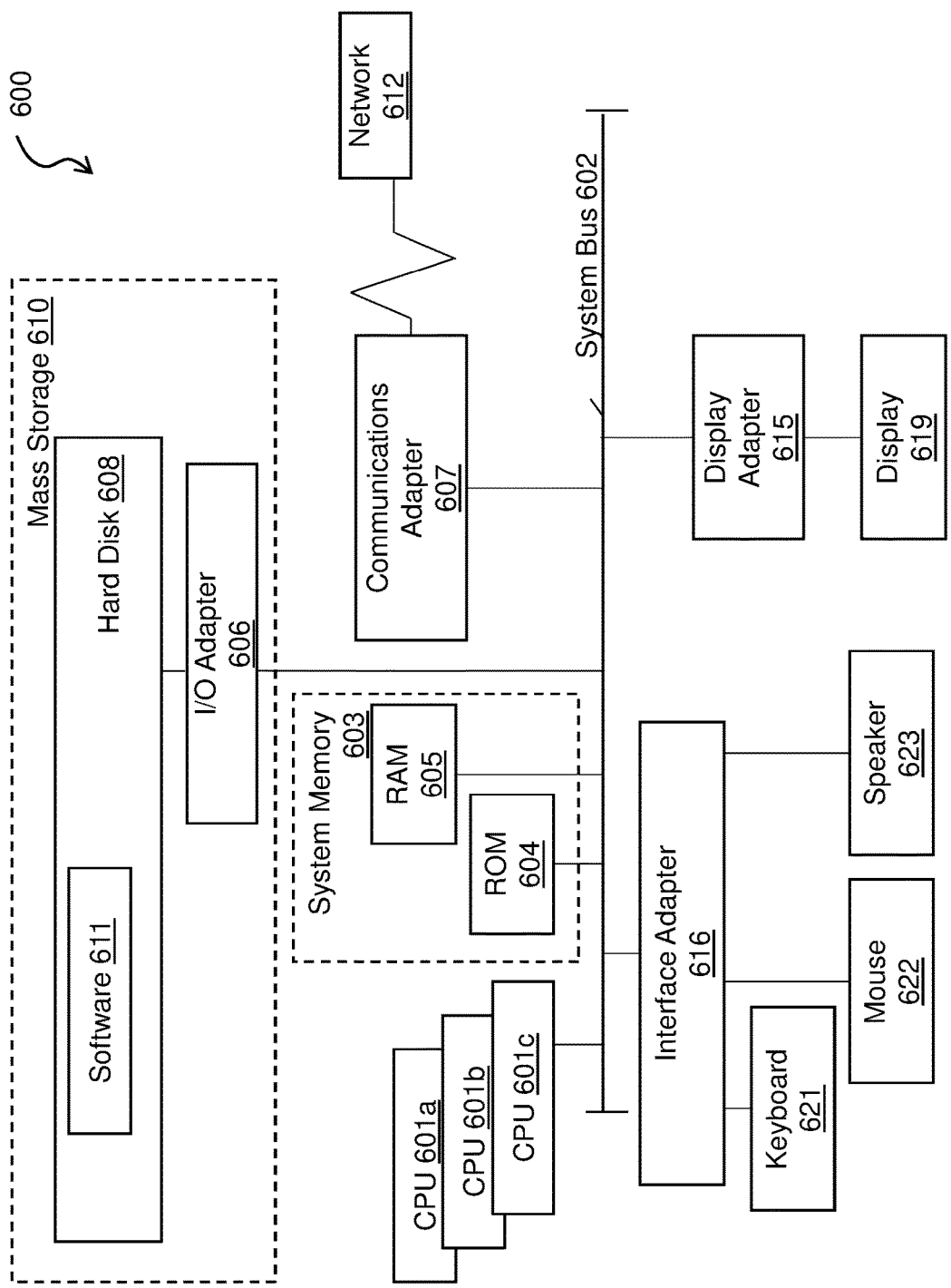
FIG. 6 is a computer system in accordance with one or more embodiments of the present invention.

Turning now to FIG. 6, a computer system 600 is generally shown in accordance with an embodiment of the present invention. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random-access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

What is claimed is:

1. A computer-implemented method comprising:
receiving, from a caller program executing in a primary runtime environment, a call to an external interface to execute a target callee program, wherein the caller program is associated with a first addressing mode and the target callee program is associated with a second addressing mode that is different from the first addressing mode;
allocating, by the external interface, an interoperability term area (ITA) in the primary runtime environment, wherein the ITA is accessible by the primary runtime environment and a secondary runtime environment;

creating, by the external interface, the secondary runtime environment associated with the second addressing mode of the target callee program, wherein the secondary runtime environment is assigned to the primary runtime environment via an anchor;

executing, by the external interface, the target callee program in the secondary runtime environment;

setting, by the target callee program, a termination reason parameter in the ITA; and in response to the target callee program setting the termination reason parameter, performing a termination action in the primary runtime environment comprising clearing data of the anchor, and clearing data shared by the primary runtime environment and the secondary runtime environment.

2. The computer-implemented method of claim 1 further comprising:

prior to execution of the target callee program, saving, by the external interface, a context of the primary runtime environment to the ITA; and prior to execution of the target callee program, setting, by the external interface, a return point address to a termination part of the external interface of the primary runtime environment.

3. The computer-implemented method of claim 2, wherein the termination reason parameter is set to NORMAL and the termination action comprises:

returning control to the primary runtime environment; and restoring the context of the primary runtime environment using the stored context from the ITA.

4. The computer-implemented method of claim 2, wherein the termination reason parameter is set to ABNORMAL and the termination action comprises:

returning control to the primary runtime environment;

in response to terminating the secondary runtime environment, return to the return point address from the ITA; and terminating the primary runtime environment.

5. The computer-implemented method of claim 1, further comprising executing, by the target callee program, a termination routine comprising:

setting the termination reason parameter of the ITA;

releasing resources of the secondary runtime environment; and returning control to the primary runtime environment.

6. The computer-implemented method of claim 1, wherein the primary runtime environment is a multi-threaded runtime environment, and wherein the secondary runtime environment corresponds to a respective thread of the multi-threaded runtime environment.

7. The computer-implemented method of claim 1, wherein the first addressing mode is a lower bit addressing mode than the second addressing mode or the first addressing mode is a higher bit addressing mode than the second addressing mode.

8. A system comprising:

at least one memory storing computer-executable instructions; and at least one processor configured to access the at least one memory and execute the computer-executable instructions to:

receive, from a caller program executing in a primary runtime environment, a call to an external interface to execute a target callee program, wherein the caller program is associated with a first addressing mode and the target callee program is associated with a second addressing mode that is different from the first addressing mode;

allocate, by the external interface, an interoperability term area (ITA) in the primary runtime environment, wherein the ITA is accessible by the primary runtime environment and a secondary runtime environment;

create, by the external interface, the secondary runtime environment associated with the second addressing mode of the target callee program, wherein the secondary runtime environment is assigned to the primary runtime environment via an anchor;

execute, by the external interface, the target callee program in the secondary runtime environment;

set, by the target callee program, a termination reason parameter in the ITA; and in response to the target callee program setting the termination reason parameter, perform a termination action in the primary runtime environment comprising clearing data of the anchor, and clearing data shared by the primary runtime environment and the secondary runtime environment.

9. The system of claim 8, wherein the at least one processor is further configured to execute the computer-executable instructions to:

prior to execution of the target callee program, save a context of the primary runtime environment to the ITA; and prior to execution of the target callee program, set a return point address to a termination part of the external interface of the primary runtime environment.

10. The system of claim 9, wherein the termination reason parameter is set to NORMAL and the termination action comprises:

returning control to the primary runtime environment; and restoring the context of the primary runtime environment using the stored context from the ITA.

11. The system of claim 9, wherein the termination reason parameter is set to ABNORMAL and the termination action comprises:

returning control to the primary runtime environment;

in response to terminating the secondary runtime environment, return to the return point address from the ITA; and terminating the primary runtime environment.

12. The system of claim 8, wherein the at least one processor is further configured to execute the computer-executable instructions to execute, by the target callee program, a termination routine comprising:

setting the termination reason parameter of the ITA;

releasing resources of the secondary runtime environment; and returning control to the primary runtime environment.

13. The system of claim 8, wherein the primary runtime environment is a multi-threaded runtime environment, and wherein the secondary runtime environment corresponds to a respective thread of the multi-threaded runtime environment.

14. The system of claim 8, wherein the first addressing mode is a lower bit addressing mode than the second addressing mode or the first addressing mode is a higher bit addressing mode than the second addressing mode.

15. A computer program product, the computer program product comprising a storage medium readable by a processing circuit, the storage medium storing instructions executable by the processing circuit to cause a method to be performed, the method comprising:

receiving, from a caller program executing in a primary runtime environment, a call to an external interface to execute a target callee program, wherein the caller program is associated with a first addressing mode and the target callee program is associated with a second addressing mode that is different from the first addressing mode;

allocating, by the external interface, an interoperability term area (ITA) in the primary runtime environment, wherein the ITA is accessible by the primary runtime environment and a secondary runtime environment;

creating, by the external interface, the secondary runtime environment associated with the second addressing mode of the target callee program, wherein the secondary runtime environment is assigned to the primary runtime environment via an anchor;

executing, by the external interface, the target callee program in the secondary runtime environment;

setting, by the target callee program, a termination reason parameter in the ITA; and in response to the target callee program setting the termination reason parameter, performing a termination action in the primary runtime environment comprising clearing data of the anchor, and clearing data shared by the primary runtime environment and the secondary runtime environment.

16. The computer program product of claim 15, the method further comprising:

prior to execution of the target callee program, saving a context of the primary runtime environment to the ITA; and prior to execution of the target callee program, setting a return point address to a termination part of the external interface of the primary runtime environment.

17. The computer program product of claim 16, wherein the termination reason parameter is set to NORMAL and the termination action comprises:

returning control to the primary runtime environment; and restoring the context of the primary runtime environment using the stored context from the ITA.

18. The computer program product of claim 16, wherein the termination reason parameter is set to ABNORMAL and the termination action comprises:

returning control to the primary runtime environment;

in response to terminating the secondary runtime environment, return to the return point address from the ITA; and terminating the primary runtime environment.

19. The computer program product of claim 15, the method further comprising executing, by the target callee program, a termination routine comprising:

setting the termination reason parameter of the ITA;

releasing resources of the secondary runtime environment; and returning control to the primary runtime environment.

20. The computer program product of claim 15, wherein the primary runtime environment is a multi-threaded runtime environment, and wherein the secondary runtime environment corresponds to a respective thread of the multi-threaded runtime environment.

* * * * *